May 2, 1933.    F. G. LILJENROTH    1,906,386
METHOD OF LEACHING PHOSPHATE ROCK WITH ACID SOLUTIONS
Filed Oct. 15, 1928
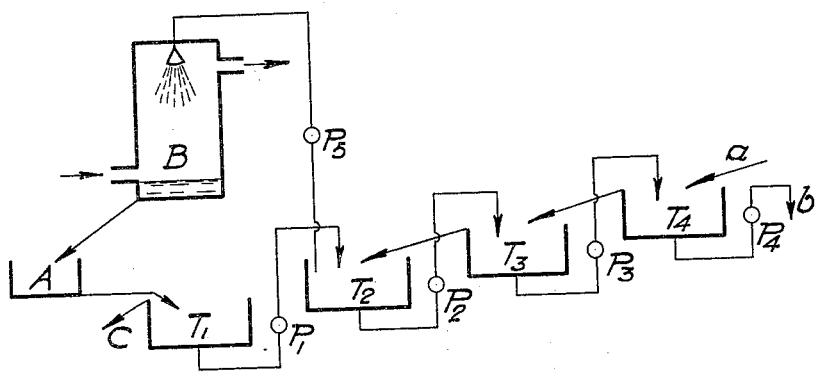
Inventor
Frans G. Liljenroth,
By Henry Orth Jr.
Atty Patented May 2, 1933

1,906,386

UNITED STATES PATENT OFFICE

FRANS GEORG LILJENROTH, OF STOCKHOLM, SWEDEN, ASSIGNOR TO KUNSTDUNGER-PATENT-VERWERTUNGS-AKTIENGESELLSCHAFT, OF GLARUS, SWITZERLAND

METHOD OF LEACHING PHOSPHATE ROCK WITH ACID SOLUTIONS

Application filed October 15, 1928, Serial No. 312,698, and in Sweden November 26, 1927.

This invention relates to a method of leaching solid raw materials with acid solutions, which materials leave insoluble residues at the leaching or cause the formation of insoluble or hardly soluble compounds during or after the leaching, and the object of the invention is to render it possible to obtain concentrated solutions of the material or materials dissolved and to recover simultaneously the solution adhering to the insoluble compounds as completely as possible.

Heretofore such processes have generally been carried out in the following manner. The solution obtained at the leaching or after possible precipitation reactions was separated from the insoluble compounds and the latter were washed out with water. The more or less diluted solution resulting therefrom was then mixed either with the leaching acid or with the solution obtained from the leaching, whereupon the resulting solution was evaporated. It is easily understood, that in such a process the washing water as well as the water normally contained in the leaching acid must be removed by evaporation.

According to the invention the necessary evaporation work is reduced by using the diluted solution obtained from the washing as absorption liquid when producing the acid used for the leaching. The invention is, preferably, intended to be used in leaching operations in which the leaching is performed by means of nitric acid, said acid being then produced by absorbing nitrous gases in the solution obtained from the washing of the insoluble compounds. In some cases the invention can advantageously be applied also in leaching with other acids such as sulphuric acid or hydrochloric acid or mixtures of such acids produced by the corresponding anhydrous acids or gaseous acids, such as sulphur trioxide or sulphur dioxide and oxygen, gaseous hydrochloric acid etc., being absorbed in the solution obtained from the washing operation. In the leaching process thus chiefly only the water which is required for the washing of the insoluble compounds is used and said quantity of water may by use of a systematical washing be maintained so low that at the leaching solutions of desired concentration of the treated raw material are obtained, which, therefore, only require low costs for their further treatment by evaporation or in other manner.

In the annexed drawing the performance of the process in a so-called Dorr-plant is illustrated, in which the undissolved residue of the raw material or precipitates obtained in or after the leaching procedure are separated and purified by washing in a set of settling tanks. $T_1$, $T_2$, $T_3$ and $T_4$ are settling tanks placed in different heights and $P_1$, $P_2$, $P_3$ and $P_4$ are pumps, by means of which the undissolved portion of the raw material suspended in liquid is pumped from one settling tank to the next preceding one which is placed in a somewhat higher level, i. e. in counter-current to the washing liquid, which may be pure water or a suitable salt solution according to the circumstances and is supplied through the inlet $a$ to the highest tank $T_4$. From said tank the insoluble compounds are removed through the pipe $b$ from the bottom, said compounds being suspended in the liquid just supplied and therefore practically freed from the solution, which is produced from the raw material at the leaching. The washing liquid is transferred by decantation from $T_4$ to $T_3$ and from there to $T_2$. From $T_2$ the washing liquid is transferred by means of a pump $P_5$ to an absorption system B, in which it is utilized as absorption liquid when producing the acid, with which the raw material is treated. The acid produced flows from B into a leaching tank A or a system of such tanks, in which the solid material to be treated with the acid is also introduced. From the tank A, which is, preferably, provided with an agitation device to bring the acid and the raw material, which latter is usually muddy or pulverulent, into close contact, the resulting solution as well as the undissolved residue of the raw material and insoluble compounds possibly formed at the leaching or possibly precipitated after the end of the leaching are transferred into the lowest settling tank $T_1$. From the upper portion of said tank the finished solution is removed through the pipe $c$ and is finally evaporated or utilized in another way. From the bottom of the lowest settling tank $T_1$ the undissolved residue together with adherent solution is pumped by means of the pump $P_1$ into the next lowest tank $T_2$ etc.

As an example of the application of the invention by use of the apparatus described above the production of concentrated solutions of calcium nitrate from nitric acid and a calcareous material may be mentioned. In this case the nitric acid and the calcareous material, such as raw phosphate in a finely divided state, or a mud of calcium carbonate, obtained at the production of ammonium sulphate of impure calcium sulphate by means of ammonia and carbon dioxide, are introduced into the tank A. The undissolved compounds purified by washing are drawn off at $b$. The water used for the washing and containing calcium nitrate is used as absorption liquid for nitrous gases in the system B. The finished concentrated calcium nitrate solution is removed at $c$.

As a second example the producing of aluminium sulphate by leaching bauxite or other aluminiferous material with sulphuric acid may be mentioned. The insoluble constituents of the aluminiferous raw material are washed with water in the settling tanks $T_2$, $T_3$, $T_4$ after the treatment with the acid and the washing water is then used as absorption liquid instead of pure water in a plant for producing the sulphuric acid required for the leaching.

As a third example the production of phosphoric acid or phosphates respectively by treating raw phosphate with an acid solution containing sulphuric acid and/or a soluble sulphate may be mentioned. The hardly soluble calcium sulphate produced in such process together with the insoluble constituents of the raw phosphate is separated from the phosphoric acid solution and then washed, for instance, with pure water or a solution of ammonium sulphate. After the washing operation the washing liquid is used as absorption liquid when producing the sulphuric acid required for the leaching.

What I claim is:—

1. Method of treating phosphate rock, which comprises leaching the phosphate rock with an acid liquor, separating the phosphoric acid solution produced from the insoluble residues, washing the latter with water to recover adhering phosphoric acid, and producing a fresh acid liquor to be used in the prosecution of the leaching process by absorbing acid forming gases in the washing liquor.

2. Method of treating phosphate rock, which comprises leaching the phosphate rock with an acid liquor containing nitric acid, separating the solution of phosphoric acid and calcium nitrate produced from the insoluble residues, washing the latter with water to recover adhering solution, and absorbing nitrous gases in the washing liquor to produce fresh acid liquor to be used in the prosecution of the leaching process.

3. Method of treating phosphate rock, which comprises leaching the phosphate rock with an acid liquor containing sulphuric acid, separating the solution of phosphoric acid produced from the insoluble residues, washing the latter with water to recover adhering solution, and producing a fresh acid liquor to be used in the prosecution of the leaching process by absorbing sulphur trioxide in the washing liquor.

In testimony whereof I have signed my name.

FRANS GEORG LILJENROTH.